US008200840B1

(12) United States Patent
Maleki et al.

(10) Patent No.: US 8,200,840 B1
(45) Date of Patent: Jun. 12, 2012

(54) METHOD AND APPARATUS FOR A GENERIC RULE BASED ENGINE TO PERFORM ACTION WHEN AN EVENT OF INTEREST TRANSPIRES

(75) Inventors: Amir Hassan Maleki, Cary, NC (US); Neil McGill, Linlithgow (GB); Saikrishnan Gopalakrishnan, Fremont, CA (US); Nachiket J. Deshpande, San Jose, CA (US); Anirban Roy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 11/105,681

(22) Filed: Apr. 13, 2005

(51) Int. Cl.
  *G06F 15/173* (2006.01)
  *H04L 12/28* (2006.01)
(52) U.S. Cl. ........................ 709/238; 370/351
(58) Field of Classification Search .............. 709/238, 709/229; 719/318; 370/351
  See application file for complete search history.

(56) References Cited

U.S. PATENT DOCUMENTS

| | | | | |
|---|---|---|---|---|
| 5,606,668 | A * | 2/1997 | Shwed ........................ | 726/13 |
| 5,774,661 | A * | 6/1998 | Chatterjee et al. ............ | 709/203 |
| 6,421,719 | B1 * | 7/2002 | Lewis et al. ................... | 709/224 |
| 6,466,984 | B1 * | 10/2002 | Naveh et al. ................... | 709/228 |
| 6,664,978 | B1 * | 12/2003 | Kekic et al. ................... | 715/733 |
| 6,820,135 | B1 * | 11/2004 | Dingman et al. .............. | 709/246 |
| 7,334,039 | B1 * | 2/2008 | Majkut et al. ................. | 709/229 |
| 7,406,534 | B2 * | 7/2008 | Syvanne et al. ............... | 709/238 |
| 2002/0069271 | A1 * | 6/2002 | Tindal et al. .................. | 709/221 |
| 2004/0001498 | A1 * | 1/2004 | Chen et al. ..................... | 370/401 |
| 2004/0059808 | A1 * | 3/2004 | Galloway et al. ............. | 709/224 |
| 2004/0196740 | A1 * | 10/2004 | Sachedina ...................... | 368/46 |
| 2005/0204308 | A1 * | 9/2005 | McNally et al. .............. | 715/810 |
| 2006/0179131 | A1 * | 8/2006 | Courtney ...................... | 709/220 |

OTHER PUBLICATIONS

Yau, D.K.Y.; Xiangjing Chen; , "Resource management in software-programmable router operating systems," Mar. 2001, Selected Areas in Communications, IEEE Journal on , vol. 19, No. 3, pp. 488-500, Mar. 2001.*
Chaabouni et al., "Discrimination network for rule condition matching in object-oriented database rule systems", 1995, Proceedings of the 1995 ACM symposium on Applied computing, pp. 51-55.*
Papamarkos et al., "Event-Condition-Action Rule Languages for the Semantic Web", 2003, Workshop on Semantic Web and Databases, 2003.*

* cited by examiner

*Primary Examiner* — Jeffrey R Swearingen
*Assistant Examiner* — Taylor Elfervig
(74) *Attorney, Agent, or Firm* — Cesari and McKenna, LLP

(57) ABSTRACT

A system and method for providing a rule based engine in a routing operating system. The system includes a set of predefined events, a set of predefined conditions and a set of predefined actions. An operator of an operating system may generate a new rule by selecting one of the predefined events, a predefined condition to be tested and an action to perform in response to an outcome of the test of the condition. The rule is then stored in memory by a router operating system and is performed when the predefined event occurs.

22 Claims, 2 Drawing Sheets

METHOD AND APPARATUS FOR A GENERIC RULE BASED ENGINE TO PERFORM ACTION WHEN AN EVENT OF INTEREST TRANSPIRES

FIELD OF THE INVENTION

This invention relates to router operating systems. More particularly, this invention relates to instructions for performing subscriber session management by the operating system. Still more particularly, this invention relates to providing an engine that allows a user to set rules based upon predefined rules, predefined conditions, and predefined actions.

SUMMARY OF THE PRIOR ART

Networks for connecting device to transfer digital data are quite common. Operators of such networks often want to customize various network elements to have feature sets to perform specific functions in the network. It is common that different operators customize their networks to perform different functions when a similar event occurs. For example, some operators provide networks connections to users for set amount of time. One such operator may wish for a user to be disconnected when the set time expires. A second such operator may wish the user to be redirected to a web portal that allows the user to purchase more time when time expires.

In the past, rules for a given event were implemented using "nerd knobs." A "nerd knob" is a Command Line Interface (CLI) addressing specific functionality that is used to by an operator to program specific behavior into a network. It is a problem that use of "nerd knobs" make the CLI confusing. Most "nerd knobs" are undocumented which causes problems when troubleshooting, may make others unaware of the feature, and may lead to misuse.

Furthermore, the rules implemented by a "nerd knob" may often only be implemented by specific hardwired logic. The hardwired logic was either within the running image of the network or operated by a CLI. For example, the following CLI may have been used to authenticate a subscriber prior to forwarding:
Vpdn authen-before forward During the forwarding attempt by the CLI, a further CLI could be configured to specify the information used to authenticate. For example:
Vpdn search-order domain dnis This CLI specifies the domain name of the subscriber or DNIS may be used for authentication. Such a CLI is useful. However, the CLI applies to all subscribers and is intrinsically linked to a specific technology. In this case, the CLI is linked to VPDN.

The use of specific hardwired logic is a problem because any modification typically requires a new CLI or modifications to software. The additional software and new CLI increase cost and may be delayed as the modifications implemented and propagated through an Inter-network Operating System (IOS).

Thus, it is clear there is a need in the art for a system for that allows network operators to generate generic rules that detect an event, evaluate a condition, and execute a specific action.

SUMMARY OF THE INVENTION

The above and other problems are solved and an advance in the art is made by a generic rule based system in accordance with this invention. A system in accordance with this invention allows a flexible means for an operator set arbitrary rule based policies based upon predefined events, conditions, and actions. A system in accordance with this invention provides an infrastructure whereby an operator may configure a predefined set of actions to be executed in response to detection of a predefined set of events under certain predefined conditions. One advantage is that with predefined actions and events coding may be uniform and documented. This provides for troubleshooting. A second advantage is that all action and events may distributed to all operators. This allows all users to better and more easily customize their system.

In accordance with this invention, a routing operating system includes a set of predefined events, set of predefined conditions and a set of predefined actions. A predefined event is a state or result that may be detected by a router operating system. A predefined condition is an evaluation of certain parameters by a router operating system. A predefined action is an application or a process that may be executed by a router operating system. The predefined events, conditions, and actions may be stored in a memory readable by a processing system executing the routing operating system. The predefined events, conditions, and actions may be stored in the memory in a library database or some other form of organizing similar pieces of data. An operator may then generate a rule by selecting one of the predefined events, a predefined condition and a predefined action to execute in response to detection of the event and evaluation of the condition. In some embodiments, the predefined actions that may be selected for an event may be limited.

In some embodiments, an operand and operators may be selected for execution after an event is detected. The predefined action may then be executed after a specified outcome of the operand.

A rule including the predefined event, predefined condition, predefined action, and any operands and operators may then be stored in a memory readable by a processing system executing the operating system.

BRIEF DESCRIPTION OF THE DRAWINGS

The above and other features and advantages of this invention are described in the following detailed description and are shown in the following drawings.

DETAILED DESCRIPTION

Figure 1:
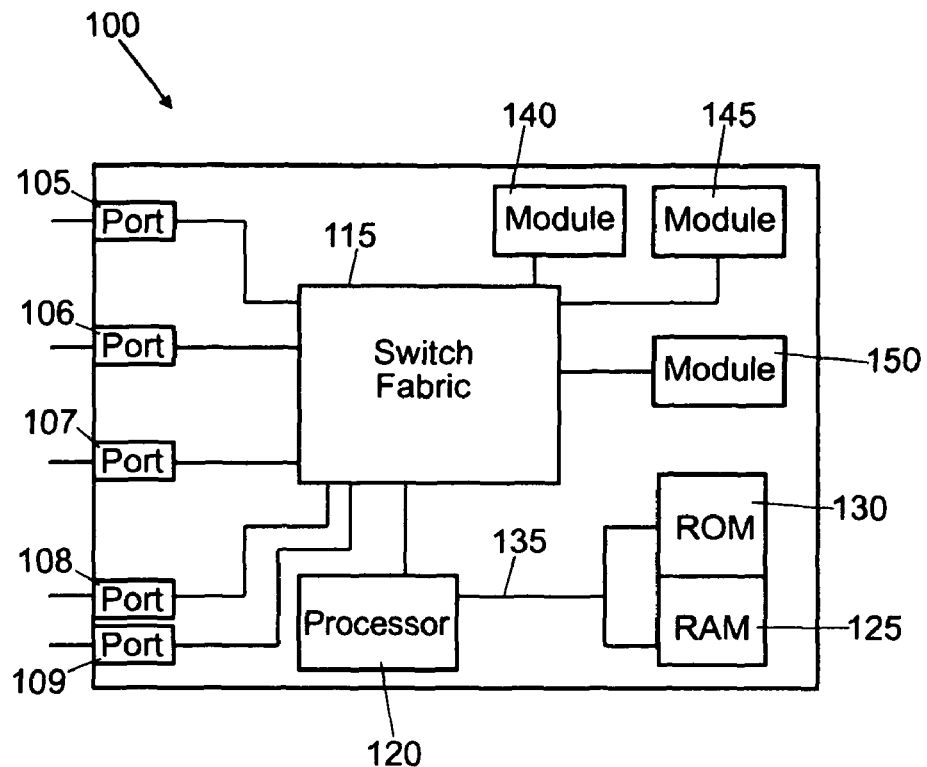
FIG. 1 illustrating a block diagram of components routing system in accordance with this invention.

This invention relates to providing a system in a routing operating system that allows for generic rule making. In the following disclosure, the same reference numeral is used for a component shown in different figures.

FIG. 1 shows a router 100. Router 100 is a switching system that transmits digital data, in the form of packets between processing systems connected to a network. One skilled in the art will recognize that router 100 may be a router, switch or any other processing system that receives and transmits digital data.

Router 100 includes ports 105-109. ports 105-109 connects router 100 to other processing system in a network. The other processing systems that may be connected include computers, other routers or any other digital processing systems. One skilled in the art will further recognize that ports 105-109 are shown for exemplary purposes only and the exact number and configuration of the ports are left to one skilled in the art designing a specific router.

Ports 105-109 are connected to switch circuitry 115. Switch circuitry 115 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 120 is connected to switching circuitry 115. Processing unit 120 is a processor, microprocessor, or any combination of processors and microprocessors that execute instructions to perform applications for performing functions in router 100. Processing unit 120 is also connected a volatile memory 125 and a non-volatile memory 130 via memory bus 135.

Volatile memory 125 is a memory such as a Random Access Memory (RAM). A volatile memory stores instructions and data used by processing unit 120 to perform applications. One such application is a router operating system. The routing operating system is applications which allow router 100 to perform other applications that provide the functions of router 100. An example of the a router operating system is Inter-network Operating System (105) designed by Cisco Systems Inc. One skilled in the art will recognize that many different types of memory may be used a non-volatile memory such SRAM and DRAM.

Non-volatile memory 130 is a memory such as a Read Only Memory (ROM). Non-volatile memory 130 stores configuration and other vital information for router 100. One skilled in the art will recognize that there many different types of memory that may be used as a non-volatile memory.

Modules 140, 145, and 150 are connected to switching circuitry 110. Modules 140,145, and 150 are device and/or software that prepare specific features in router 100. An example of a module is a Voice Over Internet Protocol (VoIP) module for providing telephonic communications to processing devices connected to router 100. One skilled in the art will recognize that the number of modules and the functions each module provides may be determined by one skilled in the art designing a particular router.

Figure 2:
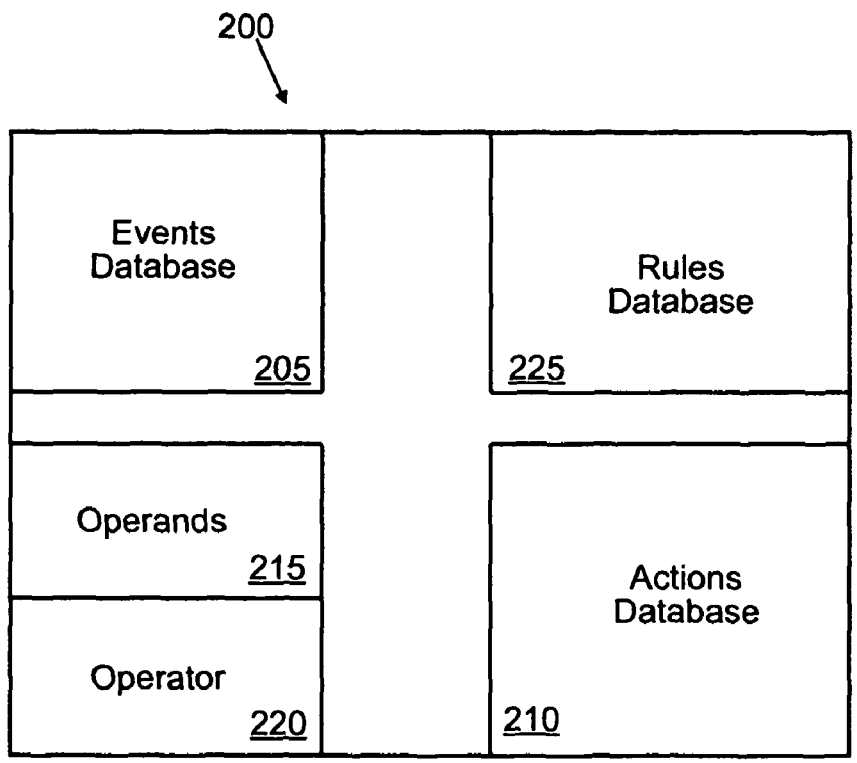
FIG. 2 illustrating a block diagram of a database for storing predefined events and actions in accordance with this invention.

This invention relates to a system that provides a system that allows an operator to configure rules for certain events. This invention is a system executed by a router operating system of a router. This invention provides predefined events that maybe detected by a router, predefined conditions that may be evaluated by the router when a predefined event is detected and predefined actions which are processes or applications that may be executed when an event is detected and in response to the condition being evaluated. FIG. 2 illustrates a memory stores predefined events and predefined actions in accordance with this invention.

Memory 200 includes a list of predefined events 205. List 205 may be a library, database or other organization of like items in a memory that are accessible by the router operating system. Each predefined event includes any information needed for use in identifying the event. One example of a predefined event may be expiration of time quota for network use by a subscriber. It is left to one skilled in the art to define particular events that are supported by this system.

Memory 200 also includes a list of predefined actions 210. List 210 may be a library, database or other organization of like items in a memory that are accessible the router operating system. Each predefined action includes any information or instructions needed for use in executing the action. Furthermore, certain actions may be supported for particular predefined events. Some examples of a predefined action may be terminating a subscribers session on the network or redirecting a subscriber to a portal where additional time may be purchased. It is left to one skilled in the art to define particular action and, if supported, the events associated with the action in this system.

Operands list 215 and operator list 220 may also be included in memory 200. Lists 215 and 220 may be libraries, databases, or any other organization of like items in a memory that are accessible by the router operating systems. The operands and operators, which together define conditions, may be used to limit conditions under which actions are executed in response to the detection of an event. The operand is performed on at least one selected operator. Certain operands may only be supported for certain predefined events and/or predefined actions. Certain operators may only be supported for certain operands, for certain predefined events and/or predefined actions.

Each rule generated by an operators in the manner described below are stored in rule list 225. List 225 may be a library, database or other organization of like items in a memory that are accessible the router operating system. The router operating systems then monitors the network for the predefined event in each rule and performs the operands and/or actions in the rule in response to the detection of the event in the rule.

Figure 3:
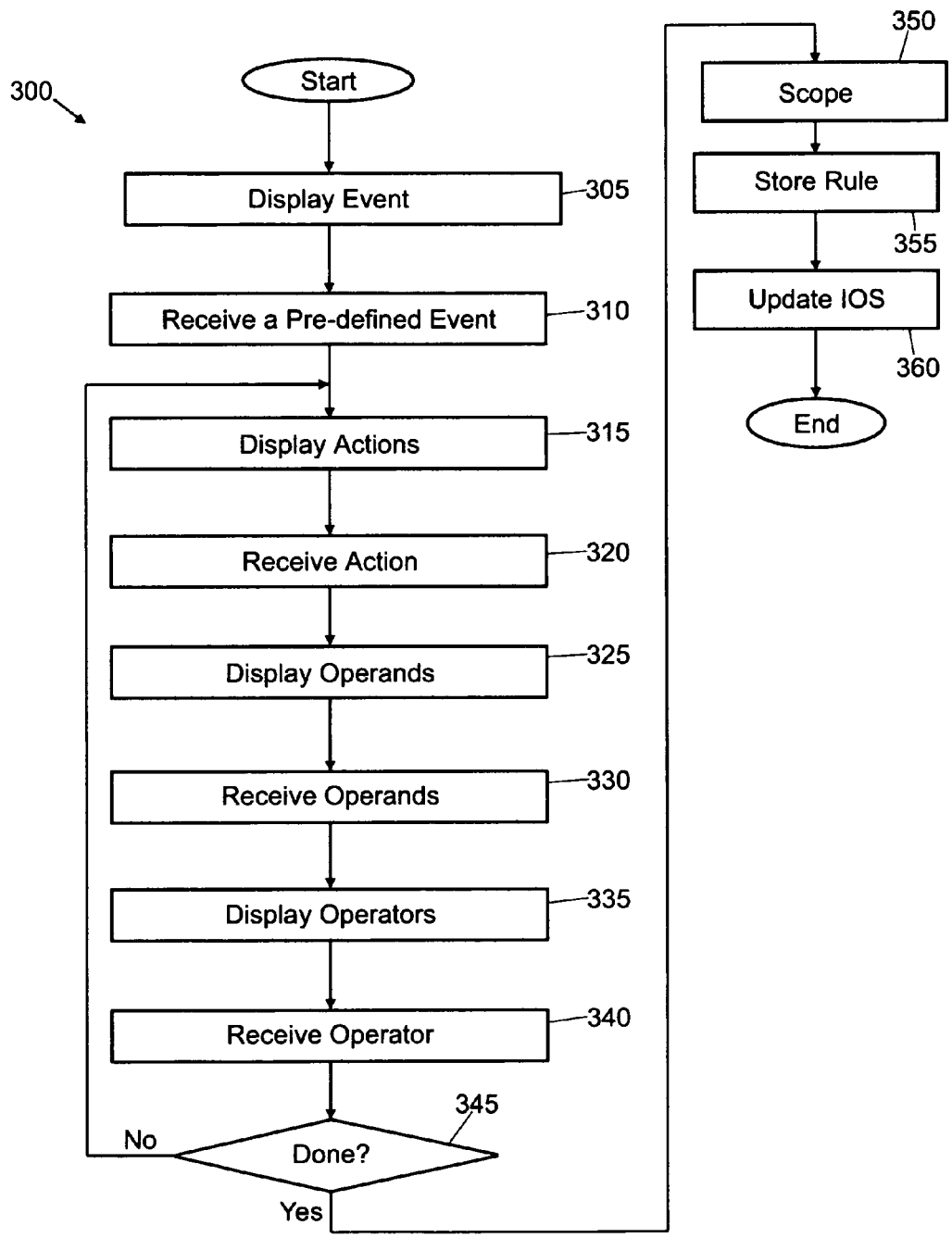
FIG. 3 illustrating a flow diagram of an exemplary embodiment in accordance with this invention.

In order to better describe this invention, the following example is used to show how a rule is generated. FIG. 3 shows exemplary embodiment of the steps for generating a rule in accordance with this invention The example is a session start for a subscriber connecting to the network. In this example, a subscriber from one domain may be treated different from a subscriber from a second domain. For convenience, the first subscriber will be from first.com and the second subscriber will be from second.com. The operator wishes to have users from first.com to be VPDN forwarded and users from second.com to a locally terminated network L3 resources while all other users are terminated.

This type of rule is has three different phases. First, there is an event that must occur for the rule to be applied. Second, the conditions that exist when the event occurs must be identified. Third, the action to take for the conditions must be defined.

Process 300 begins by displaying the list of predefined events that are supported in step 305. In the example, one such predefined event is a session start which is when a session is started for a subscriber. In step 310, a selection of a predefined event is received. In the example, the operator would select session start. The selection may be made by inputting the event or by selecting the events from the displayed list.

In step 315, a list of predefined actions supported for the predefined event are displayed. In some embodiments the actions may not be displayed, instead simple request for an action may be displayed. It is also envisioned that in some embodiments that the predefined actions displayed may be determined by the predefined events while other embodiments may present all supported predefined actions. The operator then inputs a predefined action which is received in step 320. In this case, one predefined action available is apply identifier nas-port that allows the subscriber to be VPDN forwarded. The operator selects this action.

In step 325, operands supported for the predefined event are displayed. One skilled in the art will recognize that only a request for an operand input may be displayed. Furthermore, only operands supported for a certain event may be displayed. In the example, one choice of an operand is match which is a binary comparison for a true or false. In step 330, an operand is received. In the example, the operator inputs match.

In step 335, operators for the input operand are displayed. One skilled in the art will recognize that only a request for an input of an operand may be displayed. One skilled in the art will further recognize that an operand may require more than one operator. In the example, the list of operators would include identify unauthenticated users and first.com. In step 340, the user inputs the operators and operators are received.

In step 345, it is determined whether the operator has input all of the actions for the rules. If not, process 300 is repeated from step 315. In the example, the operator, must select a second action and a third action. In the example, the operator selects a second action of service local that only allows a user to use L3 resources. The operator would then select match as an operand and identity unauthenticated user and second.com as the operators. The operator must then select a third predefined action that is service disconnect. The operator selects not match and the operators of identity unauthenticated user first.com or second.com.

In step 350, the occurrence of an event is given a scope. Scope is the place of the event in the global configuration of the router. The scoping of an event allows for hierarchy. For example, this rule may be scoped to interface level. Global scope is the lowest priority, interface level is the next lowest and overrides global. VC is the highest priority and overrides interface priority.

After all of the predefined actions and operators are selected for a predefined event, a rule is generated and stored in memory in step 355. The router operating system then begins applying the rule in step 360 and process 300 ends. When the event specified in step 310 occurs, the operands specified in step 330 for the session or a router are evaluated with operators specified in step 340. Based upon the result, of the evaluation, an action specified in step 320 is executed.

This invention provides a system for providing generic rules based upon events. The system allows for action to be executed when a predefined event occurs under certain conditions. This allows code to be more easily maintained. Furthermore, this system makes an operating system intuitive to deploy, allows for more flexible customizations and adds value both from the point of view of technical support and system developers.

The above description provides exemplary embodiments of this invention. It is envisioned that those skilled in the art can and will design alternative embodiments that infringe this invention as set forth in the following claims either literally or through the Doctrine of Equivalents.

What is claimed is:

1. A method for providing a rule based engine in a routing operating system executing on a router in a network, the router having a plurality of ports and switch circuitry to deliver packets received on a port to one or more other ports, comprising:
   displaying a plurality of predefined events supported by said routing operating system executing on said router, wherein the plurality of predefined events relate to sessions established by subscribers to access a network through said router;
   receiving a selection of a predefined event from the plurality of predefined events in said routing operating system executing on said router;
   displaying a plurality of predefined actions that are determined to be supported for said predefined event by said routing operating system executing on said router, said predefined actions to control treatment of sessions established by subscribers to access said network through said router that are managed by the routing operating system executing on said router;
   receiving a selection of a predefined action from the plurality of predefined actions for said predefined event in said routing operating system executing on said router, wherein said predefined action is performed responsive to detection of said predefined event;
   associating said predefined event with a scope selected from a plurality of scopes, said scope indicating a place where said predefined event must be detected, each of the plurality of scopes having a priority, wherein a particular rule having a predefined event associated with a higher-priority scope will override a particular rule having a predefined event associated with a lower-priority scope; and
   storing said predefined event and said predefined action as a rule in said routing operating system executing on said router.

2. The method of claim 1 wherein said predefined action is performed responsive to detection of said predefined event and a predefined condition, wherein said predefined condition is an evaluation that is performed when said predefined event is detected, the method further comprising:
   receiving a predefined operand of said predefined condition for said predefined event,
   receiving at least one operator of said predefined condition for said operand; and
   storing said predefined operand and said at least one operator, which together define said predefined condition, in said rule.

3. The method of claim 1 further comprising:
   providing a plurality of operands for each of a plurality of predefined events from which a predefined operand is selected.

4. The method of claim 3 further comprising:
   providing a plurality of operators for each of said plurality of operands from which at least one operator is selected.

5. The method of claim 1 further comprising:
   updating said routing operating system executing on said router with said rule.

6. The method of claim 5 further comprising:
   detecting said predefined event of said rule within said scope; and
   performing said predefined action for said predefined event responsive to detection of said event within said scope.

7. The method of claim 5 further comprising:
   performing an operand on at least one operator stored in said rule responsive to a detection of said predefined event within said scope; and
   performing said predefined action responsive to an outcome of said operand being performed.

8. A non-transitory computer readable medium carrying one or more instructions for providing a rule based engine in a routing operating system of a router, the router having one or more processors, a plurality of ports and switch circuitry to deliver packets received on a port to one or more other ports, the one more instructions including instructions which executed by the one or more processors of said router, cause the one or more processors to:
   display a plurality of predefined events supported by said routing operating system of said router, wherein the plurality of predefined events relate to sessions established by subscribers to access a network through said router;
   receive a selection of a predefined event from the plurality of predefined events in said routing operating system of said router;

display a plurality of predefined actions that are determined to be supported for said predefined event by said routing operating system of said router, said predefined actions to control treatment of sessions established by subscribers to access said network through said router that are managed by the routing operating system of said router;

receive a selection of a predefined action from the plurality of predefined actions for said predefined event in said routing operating system of said router, wherein said predefined action is performed responsive to detection of said predefined event;

associate said predefined event with a scope selected from a plurality of scopes, said scope to indicate a place where said predefined event must be detected, each of the plurality of scopes having a priority, wherein a particular rule having a predefined event associated with a higher-priority scope will override a particular rule having a predefined event associated with a lower-priority scope; and store said predefined event and said predefined action as a rule in said routing operating system of said router.

9. The non-transitory computer readable medium of claim 8 wherein said predefined action is performed responsive to detection of said predefined event and a predefined condition, wherein said predefined condition is an evaluation that is performed when said predefined event is detected, the computer readable medium further comprising instructions which executed by the one or more processors of said router, cause the one or more processors to:

receive a predefined operand of said predefined condition for said predefined event;

receive at least one operator of said predefined condition for said operand; and store said predefined operand and said at least one operator, which together define said predefined condition, in said rule.

10. The non-transitory computer readable medium of claim 8 further comprising instructions which executed by the one or more processors of said router, cause the one or more processors to:

provide a plurality of operands for each of a plurality of predefined events from which a predefined operand is selected.

11. The non-transitory computer readable medium of claim 10 further comprising instructions which executed by the one or more processors of said router, cause the one or more processors to:

provide a plurality of operators for each of said plurality of operands from which at least one operator is selected.

12. The non-transitory computer readable medium of claim 8 further comprising instructions which executed by the one or more processors of said router, cause the one or more processors to:

update said routing operating system with said rule.

13. The non-transitory computer readable medium of claim 12 further comprising instructions which executed by the one or more processors of said router, cause the one or more processors to:

detect said predefined event of said rule within said scope; and perform said predefined action for said predefined event responsive to detection of said event within said scope.

14. The non-transitory computer readable medium of claim 12 further comprising instructions which executed by the one or more processors of said router, cause the one or more processors to:

perform an operand on at least one operator stored in said rule responsive to a detection of said predefined event within said scope; and perform said predefined action responsive to an outcome of said operand being performed.

15. A method comprising:

displaying a plurality of predefined events that are supported by a routing operating system executing on a router having a plurality of ports and switch circuitry to deliver packets received on a port to one or more other ports, wherein the plurality of predefined events relate to sessions established by subscribers to access a network through said router;

receiving a selection of a predefined event from the plurality of predefined events supported by said routing operating system executing on said router;

receiving a selection of a predefined condition, wherein a predefined condition is an evaluation that is performed by said routing operating system executing on said router when said predefined event is detected;

displaying a plurality of predefined actions that are supported by said routing operating system executing on said router, wherein said predefined actions control an aspect of the sessions established by subscribers to access said network through said router to provide differing treatment by the routing operating system of different subscribers;

receiving a selection of a predefined action from said plurality of predefined actions;

associating said predefined event with a scope selected from a plurality of scopes, said scope indicating a place where said predefined event must be detected, each of the plurality of scopes having a priority, wherein a particular rule having a predefined event associated with a higher-priority scope will override a particular rule having a predefined event associated with a lower-priority scope, said plurality of scopes including at least scopes of global and interface level within the router;

storing said predefined event, said predefined condition, and said predefined action for which selection was received as a rule by said routing operating system executing on said router;

monitoring within said scope for an occurrence of said predefined event in said rule; and in response to detection of said predefined event in said rule within said scope, checking said predefined condition, and, if said condition is met, performing said predefined action in said rule by said routing operating system executing on said router to control said aspect of the sessions established by subscribers to access said network through said router to provide differing treatment by the routing operating system of different subscribers.

16. The method of claim 15 wherein said displaying a plurality of predefined actions displays only predefined actions that are supported for said predefined event for which selection was received.

17. The method of claim 15 further comprising:

displaying a plurality of operands supported for said predefined action for which selection was received; and receiving a selection of an operand from said plurality of operands.

18. The method of claim 17 further comprising:

displaying a plurality of operators; and receiving a selection of an operator from said plurality of operators.

19. The method of claim 15, wherein said predefined event is expiration of a time quota for a session established by a subscriber to access said network through said router.

20. The method of claim 19, wherein said predefined action is terminating said session established by said subscriber to access said network through said router.

21. The method of claim 19, wherein said predefined action is redirecting said subscriber to a portal.

22. The method of claim 15, wherein said predefined actions provide differing treatment by the routing operating system of different subscribers by directing the sessions of subscribers from a first domain differently than subscribers from a second domain.

* * * * *

UNITED STATES PATENT AND TRADEMARK OFFICE
CERTIFICATE OF CORRECTION

| | | |
|---|---|---|
| PATENT NO. | : 8,200,840 B1 | Page 1 of 1 |
| APPLICATION NO. | : 11/105681 | |
| DATED | : June 12, 2012 | |
| INVENTOR(S) | : Maleki et al. | |

It is certified that error appears in the above-identified patent and that said Letters Patent is hereby corrected as shown below:

Col. 3, line 26 should read: "system is Inter-network Operating System ~~(105)~~ (IOS) designed by"

Signed and Sealed this
Thirty-first Day of July, 2012

David J. Kappos
*Director of the United States Patent and Trademark Office*